Patented June 28, 1949

2,474,737

UNITED STATES PATENT OFFICE 2,474,737

MONOAZO DYESTUFFS

Basil Jason Heywood, Blackley, Manchester, England, assignor to Imperial Chemical Industries Limited, a corporation of Great Britain No Drawing. Application August 3, 1945, Serial No. 608,844. In Great Britain August 28, 1944

4 Claims. (Cl. 260—205)

This invention relates to the manufacture of new monoazo dyestuffs, and more particularly to such dyestuffs as are eminently suitable for dyeing cellulose acetate artificial silk and nylon fibres.

According to the present invention new monoazo dyestuffs are manufactured by a process comprising coupling diazotised 2-cyano-4-nitroaniline or a 6-halogeno derivative thereof with the sulphuric ester of an N-hydroxyalkyl-N-(phenyl, naphthyl, phenoxy or naphthoxy)-alkyl (2, 3, 4 or 5 carbon atoms)-aniline which may carry further substituents subject to its being capable of coupling in the para-position to the nitrogen atom.

Examples of diazo components which may be employed are 2-cyano-4-nitroaniline, 2-cyano-6-chloro-4-nitroaniline, and 2-cyano-6-bromo-4-nitroaniline.

Coupling components which may be used for example in this invention are the sulphuric esters of the following hydroxy alkylated anilines:

N-β-hydroxyethyl-N-β'-phenylethylaniline
N-β-hydroxyethyl-N-β'-phenylethyl-m-aminotoluene
N-β-hydroxyethyl-N-β'-phenylethyl-2-methoxy-5-methylaniline
N-β-hydroxyethyl-N-β'-phenylethyl-m-aminoanisole
N-β-hydroxyethyl-N-β'-phenylethyl-m-acetylaminoaniline
N-β-hydroxyethyl-N-β'-phenylethyl-m-chloraniline
N-β-hydroxyethyl-N-γ'-phenylpropylaniline
N-β-phenylethyl-N-β'-hydroxy-n-propylaniline
N-β-phenylethyl-N-ε'-hydroxy-n-amylaniline
N-β-hydroxyethyl-N-α'-phenylethylaniline
N-β-hydroxyethyl-N-β'-naphthyl(2)ethylaniline
N-β-hydroxyethyl-N-β'-phenoxyethylaniline
N-β-hydroxyethyl-N-β'-p-tolyloxyethylaniline
N-β-hydroxyethyl-N-β'-p-chlorophenoxyethylaniline
N-β-hydroxyethyl-N-β'-(α'')-naphthoxyethylaniline
N-β-hydroxyethyl-N-β'-phenoxyethyl-m-aminotoluene
N-β-hydroxyethyl-N-β'-phenoxyethyl-cresidine
N-β-hydroxyethyl-N-β'-phenoxyethyl-m-chloraniline
N-β-hydroxyethyl-N-β'-phenoxyethyl-o-aminoanisole
N-β-hydroxyethyl-N-β'-phenoxyethyl-m-acetylaminoaniline
N-β-hydroxyethyl-N-α'-phenoxyethylaniline
N-β-hydroxyethyl-N-γ'-phenoxypropylaniline
N-β-hydroxy-n-propyl-N-β-phenoxyethylaniline
N-ω-hydroxy-n-amyl-N-β-phenoxyethylaniline
N-β-hydroxyethyl-N-ω-phenoxy-n-amylaniline The new dyestuffs in the form of their alkali metal or ammonium salts, are soluble in water and have very good affinity for cellulose acetate artificial silk which they dye from a neutral, slightly acid or slightly alkaline dyebath in violet and blue shades. The resulting shades possess good fastness properties, are dischargeable and are suitable for printing cellulose acetate artificial silk. The new dyestuffs are, moreover, generally suitable for application to cellulose acetate artificial silk from dilute or "long liquors" such as are employed in dyeing with the winch.

The new dyestuffs are also valuable for the dyeing of wool, natural silk, tin weighted silk, leather and nylon fibres.

The new dyestuffs are advantageously applied to the colouring of synthetic fibres, for example, those composed of or comprising cellulose acetate and/or nylon, which application constitutes a still further feature of this invention.

The invention is illustrated but not limited by the following examples in which the parts are by weight:

Example 1

16.3 parts of 2-cyano-4-nitroaniline are diazotised by the method described in Example 1 of British specification No. 447,561 and the solution of the diazo compound is poured onto ice and the product is added gradually to a cooled and stirred solution of 37.8 parts of the sodium salt of N-β-phenylethyl-N-β-hydroxyethyl-m-chloroaniline sulphuric ester in 400 parts of water. When the coupling is complete 40% aqueous sodium hydroxide is added slowly to the mixture the temperature thereof being kept below 10° C., until the coupling medium is just alkaline to litmus. The mixture is then stirred during one hour and the dyestuff is then filtered off, washed with a little water and dried at 30–40° C. This new dyestuff forms a black powder which dissolves in hot water to give a reddish violet solution and in sulphuric acid to give a dull red solution. The dyestuff dyes cellulose acetate artificial silk and nylon fibre or fabric in bright reddish violet shades of very good fastness to light and to wet treatments when applied from a neutral dyebath containing sodium chloride or sodium sulphate.

Example 2

16.3 parts of 2-cyano-4-nitroaniline are diazotised by the method described in Example 1 of British specification No. 447,561 and the solution so-obtained is added to a stirred and cooled solution of 35.7 parts of the sodium salt of N-β-hydroxyethyl-N-β'-p-tolyloxyethylaniline sulphuric ester in 400 parts of water. When the coupling is complete 40% aqueous sodium hydroxide solution is added slowly to the mixture, the temperature thereof meanwhile being kept below 10° C. by external cooling, until the mixture is just alkaline to litmus. It is then further stirred for an hour and the dyestuff is then filtered off and dried at 30-40° C. The dyestuff forms a greenish black powder which dissolves in hot water to give a reddish violet solution and in sulphuric acid to give a dull crimson solution. It dyes cellulose acetate artificial silk and nylon fibre or fabric in violet shades of very good light fastness when applied from a neutral dyebath containing sodium chloride or sodium sulphate.

*Example 3*

19.8 parts of 2-cyano-6-chloro-4-nitroaniline are diazotised by addition to a stirred solution of 6.9 parts of sodium nitrite in 160 parts of concentrated sulphuric acid. The solution is stirred for 2 hours and is then poured into a stirred mixture of 400 parts of ice and 200 parts of water. This diazo solution is immediately added to a stirred and cooled solution of 34.3 parts of the sodium salt of N-β-hydroxyethyl-N-β'-phenylethylaniline sulphuric ester in 400 parts of water. When the addition is complete, 10 N aqueous sodium hydroxide solution is added to the mixture until it is just alkaline to litmus, the temperature being meanwhile kept below 10° C. by external cooling. The mixture is then stirred for one hour and the dyestuff is then filtered off and dried. It forms a dark violet powder which dissolves in water to give a bluish violet solution and in concentrated sulphuric acid to give a reddish brown solution.

The new dyestuff dyes cellulose acetate artificial silk and nylon fibres and fabric in bluish violet shades of good fastness to light when applied from a neutral dyebath containing sodium chloride or sodium sulphate.

*Example 4*

19.8 parts of 2-cyano-6-chloro-4-nitroaniline are diazotised by addition to a solution kept below 5° C. of 6.9 parts of sodium nitrite in 160 parts of concentrated sulphuric acid. The mixture is stirred for 2 hours and is then slowly added to a stirred solution of 35.7 parts of the sodium salt of N-β-hydroxyethyl-N-β'-phenylethyl-m-toluidine sulphuric ester in 400 parts of water kept below 5° C. When this addition is complete, 40% aqueous sodium hydroxide is added until the mixture is just alkaline to litmus. It is then stirred for 1 hour and the dyestuff is then filtered off and dried at 30-40° C. The dyestuff forms a black powder which dissolves in hot water to give a violet solution and in concentrated sulphuric acid to give a reddish brown solution.

The new dyestuff dyes cellulose acetate artificial silk and nylon fibres and fabrics in reddish blue shades of good fastness to light and wet treatments.

Further examples illustrative of the invention are set forth in tabular form below:

| Example No. | Diazo Component | Coupling Component | Shade on cellulose acetate artificial silk |
|---|---|---|---|
| 5 | 2-cyano-4-nitroaniline | N-β-hydroxy-ethyl-N-β'-(1-naphthyl)-ethylaniline sulphuric ester | violet. |
| 6 | do | N-β-hydroxy-ethyl-N-β'-phenoxyethylaniline sulphuric ester | reddish violet. |
| 7 | do | N-β-hydroxyethyl-N-β'-p-chlorophenoxy-ethylaniline sulphuric ester | Do. |
| 8 | do | N-β-hydroxyethyl-N-β'-p-phenylethyl-m-toluidine sulphuric ester | violet. |
| 9 | 2-cyano-6-chloro-4-niltroaniline | N-β-hydroxyethyl-N-β'-phenoxyethylaniline sulphuric ester | Do. |

I claim:
1. A monoazo dyestuff which in the form of its acid is represented by the general formula,

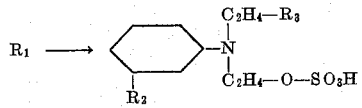

wherein R₁ is a member selected from the group consisting of 2-cyano-4-nitroaniline, 2-cyano-6-chloro-4-nitroaniline and 2-cyano-6-bromo-4-nitroaniline; R₂ is a substituent selected from the group consisting of hydrogen, chloro and methyl; and R₃ is a radical selected from the group consisting of phenyl, phenoxy, tolyloxy and chlorophenoxy.

2. A monazo dyestuff which in the form of its acid is represented by the formula

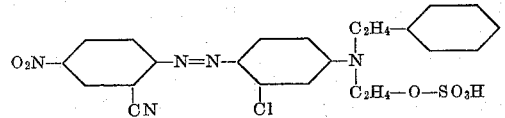

3. A monazo dyestuff which in the form of its acid is represented by the formula

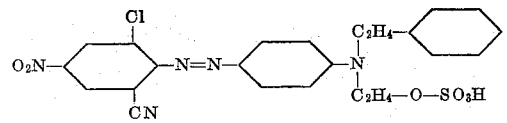

4. A monazo dyestuff which in the form of its acid is represented by the formula

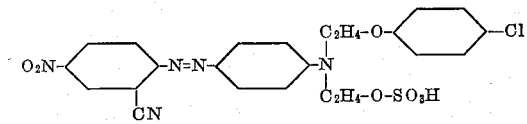

BASIL JASON HEYWOOD.

REFERENCES CITED

The following references are of record in the file of this patent:

UNITED STATES PATENTS

| Number | Name | Date |
|---|---|---|
| 2,117,733 | Krzikalla | May 17, 1938 |
| 2,361,618 | Felix | Oct. 31, 1944 |
| 2,384,734 | Felix | Sept. 11, 1945 |

FOREIGN PATENTS

| Number | Country | Date |
|---|---|---|
| 648,768 | Germany | Aug. 11, 1937 |